(12) United States Patent
Ryan

(10) Patent No.: US 6,464,508 B1
(45) Date of Patent: Oct. 15, 2002

(54) METHOD AND APPARATUS FOR TEACHING MUSIC THEORY

(76) Inventor: Kathy Ryan, 5317 Devonshire, #2E, St. Louis, MO (US) 63109

( * ) Notice: Subject to any disclaimer, the term of this patent is extended or adjusted under 35 U.S.C. 154(b) by 0 days.

(21) Appl. No.: 09/711,461

(22) Filed: Nov. 13, 2000

(51) Int. Cl.⁷ .......................... G09B 25/00; G09B 15/00
(52) U.S. Cl. .................. 434/365; 434/128; 84/470 R; 273/301; 206/223
(58) Field of Search ................................ 434/365, 128; 273/301, 271; 84/470 R, 483.2, 477 R; 206/223, 575, 224

(56) References Cited

U.S. PATENT DOCUMENTS

| | | | |
|---|---|---|---|
| 1,313,015 A | * 8/1919 | Reeve | |
| 2,497,364 A | * 2/1950 | Mayberry | 84/477 R |
| 3,884,111 A | * 5/1975 | Leonard | 84/477 R |
| 3,884,113 A | * 5/1975 | Leonard | 84/477 R |
| 4,887,507 A | 12/1989 | Shaw | |

FOREIGN PATENT DOCUMENTS

GB 2119154 * 11/1983 ............. 84/477 R

* cited by examiner

*Primary Examiner*—Jacob K. Ackun
*Assistant Examiner*—Bena B. Miller
(74) *Attorney, Agent, or Firm*—Thompson Coburn LLP

(57) ABSTRACT

A method of teaching music theory employs a plurality of game pieces. The game pieces correspond to notes on a music scale. The game pieces are arrangeable in a manner in which each game piece is adjacent to at least one of the other game pieces. The method comprises assigning a first orientation to correspond to a whole step and assigning a second orientation to correspond to a half step. The first orientation constitutes a first spatial relationship between adjacent game pieces. The second orientation constitutes a second spatial relationship between adjacent game pieces. The second spatial relationship differs from the first spatial relationship. The method further comprises arranging the game pieces in a manner so that each game piece is adjacent to at least one of the other game pieces in either the first orientation or the second orientation.

18 Claims, 1 Drawing Sheet

METHOD AND APPARATUS FOR TEACHING MUSIC THEORY

BACKGROUND OF THE INVENTION

This invention relates to a method and apparatus for teaching music theory. In particular, the invention facilitates teaching students about scales and modes used in music.

Music theory is often taught using a keyed instrument or textbooks. This type of instruction is not suitable for all individuals. Children, for example, often find textbook instruction to be non-stimulating and, as a result, do not retain as much information as they could through different or multiple means. While the use of a keyed instrument to teach music theory can provide both visual and auditory stimulus, a child's short attention span results in the child losing interest. In addition, not all individuals that are interested in learning music theory are interested in keyed instruments. Individuals will learn better when provided with multisensory inputs when learning new information.

BRIEF SUMMARY OF THE INVENTION

Among the several objects of the present invention may be noted the provision of an improved method and apparatus of teaching music theory; the provision of such a method and apparatus that employs multisensory inputs; the provision of such a method and apparatus that is entertaining and fun.

Generally, a method of teaching music theory of the present invention employs a plurality of game pieces. The game pieces correspond to notes on a music scale and are arrangeable in a manner in which each game piece is adjacent to at least one of the other game pieces. The method comprises assigning a first orientation to correspond to a whole music step and assigning a second orientation to correspond to a half music step. The first orientation constitutes a first spatial relationship between adjacent game pieces. The second orientation constitutes a second spatial relationship between adjacent game pieces. The second spatial relationship differs from the first spatial relationship. The method further comprises arranging the game pieces in a manner so that each game piece is adjacent to at least one of the other game pieces in either the first orientation or the second orientation.

In another aspect of the present invention, a kit for facilitating teaching of music theory to a user comprises a plurality of game pieces and a manual packaged with the game pieces providing instructions for using the game pieces. The game pieces have indicia corresponding to notes on a music scale. The game pieces are arrangeable in a manner in which each game piece is adjacent to at least one of the other game pieces. The manual includes instructions assigning a first orientation to correspond to a whole music step and instructions assigning a second orientation to correspond to a half music step. The first orientation constitutes a first spatial relationship between adjacent game pieces. The second orientation constitutes a second spatial relationship between adjacent game pieces and differs from the first spatial relationship. The manual includes instructions directing the user to arrange at least some of the game pieces in a manner so that each game piece of said at least some of the game pieces is adjacent at least one of the other game pieces of said at least some of the game pieces in one of the first and second orientations.

Other objects and features will be in part apparent and in part pointed out hereinafter.

BRIEF DESCRIPTION OF THE DRAWINGS

FIG. 2 is a top plan view of some of the game pieces of FIG. 1 arranged to represent the C major scale in a hop-scotch configuration;

DETAILED DESCRIPTION OF THE INVENTION

Figure 1:
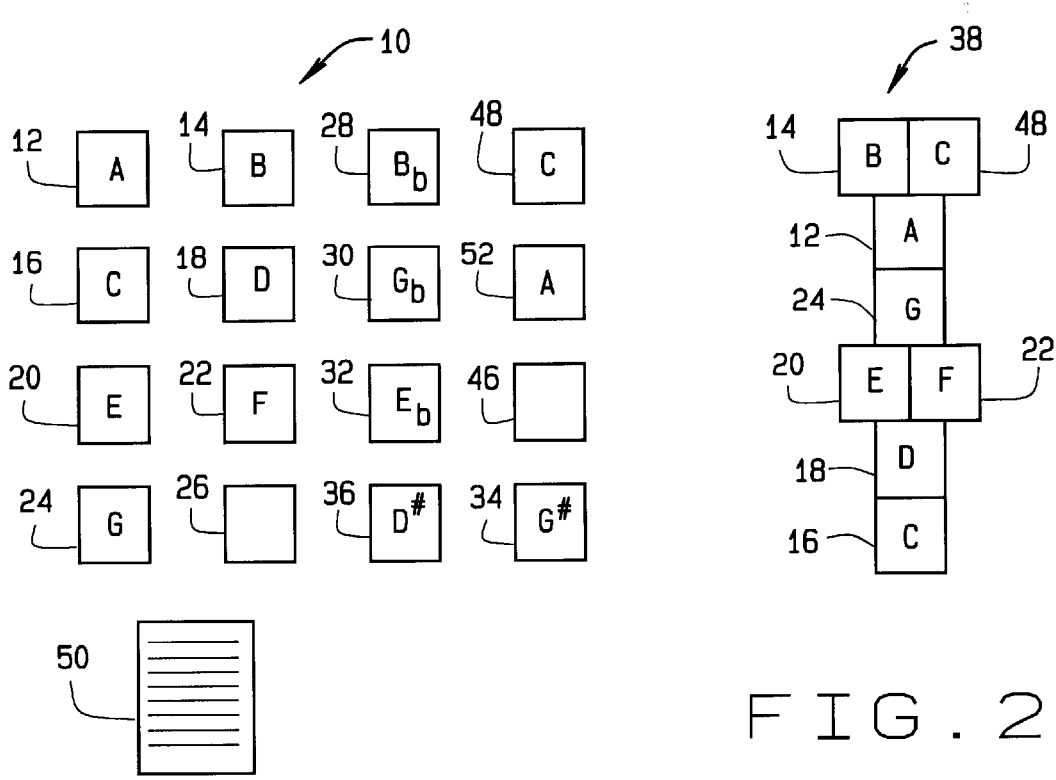
FIG. 1 is a top plan view of the contents of a kit of the present invention showing some game pieces and instructions of the kit.

Referring now to the drawings, and first more particularly to FIG. 1, a music theory game of the present invention is in the form of a kit, generally indicated at reference numeral 10. The kit 10 includes a plurality of separate game pieces. Preferably, at least most of the game pieces correspond to musical notes. For instance, in FIG. 1 game piece 12 has been assigned the musical note A, while game pieces 14, 16, 18, 20, 22, 24, 28, 30, 32, 34, 36, 48, and 52 have been assigned the musical notes B, C, D, E, F, G, $B_b$, $G_b$, $E_b$, $G^\#$, $D^\#$, C, and A respectively. Game pieces 26 and 46 have been assigned a blank for use when steps larger than a whole step exists between successive notes in a music scale, as will be made clear below. Although not shown, it is to be understood that the kit 10 preferably includes all possible musical notes (including all flats and all sharps). Also preferably, the kit 10 includes duplicate game pieces to accommodate scales having octave notes. The kit 10 further includes a manual 50 with instructions as to how to use the game pieces. It is also to be understood that the manual 50 may be a single sheet of paper, a booklet, instructions on a box lid, a diskette, or any other tangible medium upon which instructions may be conveyed to a user.

While the game pieces are shown as being generally square, it is to be understood that the game pieces may be of other shapes without departing from the scope of this invention. For instance, the game pieces may be rectangular, round, pointed, etc. The game pieces could also be configured to lock together via interlocking components, with jig saw type connections, velcro, or any other means for connecting the game pieces. Preferably, the game pieces are shaped to allow them to be arranged adjacent to each other in at least two different spatial relationships.

Western music scales are typically composed of musical notes that vary in one-half step increments or multiples thereof. Each major scale has two half steps and five whole steps, with the half steps being between the third and fourth and seventh and eighth notes. For example, the C-major scale is comprised of the notes C-D-E-F-G-A-B-C. Natural minor scales also have two half steps and five whole steps with the half steps being between the second and third and fifth and sixth notes. For example, the A natural minor scale is comprised of the notes A-B-C-D-E-F-G-A. Some other scales have steps larger than whole steps. A blues scale has two half steps, two whole steps, and two one and one-half steps, with the half steps being between the third and fourth and fourth and fifth notes, the whole steps being between the second and third and sixth and seventh notes, and the one and one-half steps being between the first and second and fifth and sixth notes. For example, a C blues scale is comprised of the notes $C$-$E_b$-$F$-$G_b$-$G$-$B_b$-$C$. A gypsy minor scale has four half steps, a whole step, and two one and one-half steps, with the half steps being between the second and third, fourth and fifth, fifth and sixth, and seventh and eighth notes, the whole step being between the first and second notes, and the one and one-half steps being between the third and fourth and sixth and seventh notes. For example, an A gypsy minor scale is comprised of the notes A-B-C-D#-E-F-G#-A. It is the use of these varying intervals between notes that allow for the variety of scales that exist. While four different scales have been discussed, it is to be understood that the method of the present invention may be used for all musical scales and those listed are for illustrative purposes and are not intended to limit the scope of the present invention.

The method of teaching music theory via these game pieces involves selecting a music scale to be learned and then assigning the appropriate notes to selected game pieces so that all the notes in the scale can be represented. A first orientation is assigned to represent a whole step on the music scale and a second orientation is assigned to represent a half step on the music scale. The first orientation constitutes a first spatial relationship between adjacent game pieces and the second orientation constitutes a second spatial relationship between adjacent game pieces. The second spatial relationship differs from the first spatial relationship. The user then arranges the selected game pieces so that they are adjacent to at least another of the selected game pieces in either the first or second orientation so that their arrangement and corresponding orientations represent the whole and half steps of the music scale. For example, to represent the C major scale, which has two half steps and six whole steps, the selected game pieces are chosen to represent the notes C, D, E, F, G, A, B, and C. The selected game pieces are then placed adjacent one another in the two orientations.

Preferably, the first orientation corresponds to a longitudinal spatial relationship between adjacent selected game pieces, such as the orientation of game piece 16 to game piece 18, or game piece 18 to game piece 20, as shown in FIG. 2. The second orientation preferably corresponds to a lateral spatial relationship between adjacent selected game pieces such as the orientation of game piece 20 to game piece 22 in FIG. 2. The selected game pieces are then either longitudinally adjacent and/or laterally adjacent other selected game pieces. This arrangement yields a hop-scotch configuration. The hop-scotch configuration can be seen in FIG. 2 wherein the C major scale 38 is shown with the game pieces oriented in the first and second orientations. In FIG. 2, game pieces 16, 18, 22, 24, and 12 are adjacent game pieces 18, 20, 24, 12, and 14, respectively in the first (longitudinal as shown in FIG. 2) orientation, and correspond to whole steps in a C major scale 38. Likewise, game pieces 20 and 14 are adjacent game pieces 22 and 48, respectively in the second (lateral as shown in FIG. 2) orientation and correspond to half steps in a C major scale 38. Therefore, the preferred embodiment for the method of teaching music theory of the C major scale is shown in FIG. 2.

A hop-scotch configuration may also be employed for many other different music scales. For instance, an A natural minor scale 40, shown in FIG. 3, uses the same first and second orientations corresponding to the same spatial relationships and steps on a music scale as shown in FIG. 2 but has a different overall appearance due to the different scale being represented. The whole steps of the A natural minor scale 40 are represented by the following game pieces arranged adjacent each other in the first (longitudinal) orientation: game pieces 12 with 14 (representing notes A to B); game pieces 16 with 18 (representing notes C to D); game pieces 18 with 20 (representing notes D to E); game pieces 22 with 24 (representing notes F to G); and game pieces 24 and 52 (representing notes G to A). The half steps of the A natural minor scale 40 are represented by the following game pieces arranged adjacent each other in the second (lateral) orientation: game pieces 14 with 16 (representing notes B to C); and game pieces 20 with 22 (representing notes E to F).

Figures 3, 4, 5:
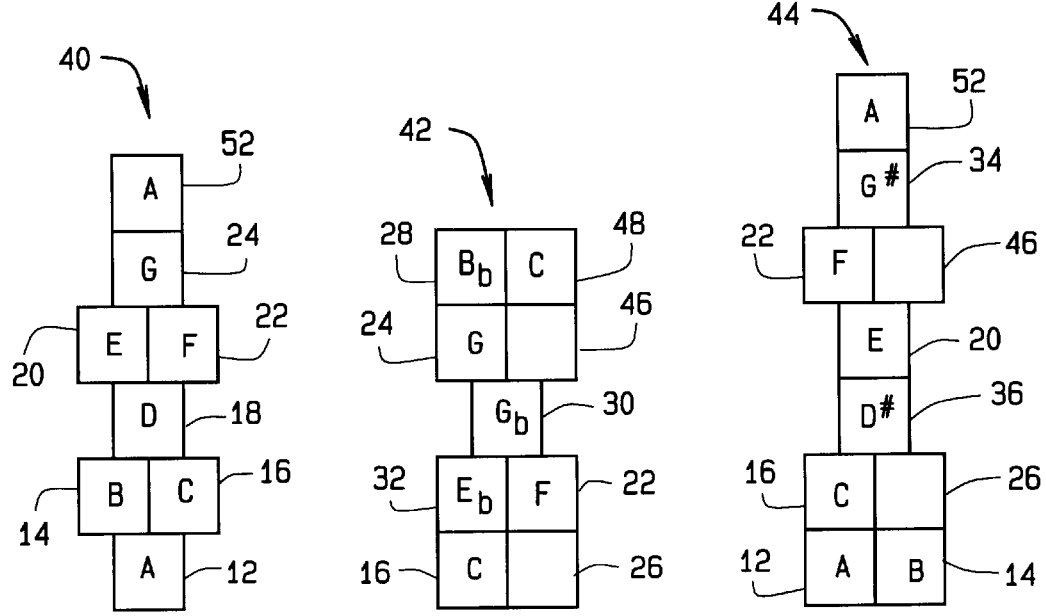
FIG. 3 is a top plan view of some of the game pieces of FIG. 1 arranged to represent the A natural minor scale in a hop-scotch configuration.
FIG. 4 is a top plan view of some of the game pieces of FIG. 1 arranged to represent a blues scale in a hop-scotch configuration.
FIG. 5 is a top plan view of some of the game pieces of FIG. 1 arranged to represent a gypsy minor scale in a hop-scotch configuration.

Some music scales also involve a difference between successive notes of more than a whole step, such as one and one-half steps, instead of only half steps and whole steps. The half steps and whole steps are represented by the relative orientations of two adjacent game pieces as discussed above. A one and one-half step may be represented by using the assigned orientations in conjunction with a blank game piece 26, 46. FIG. 4 shows a blues scale 42. In this embodiment, the second orientation is a longitudinal spatial relationship between adjacent selected game pieces, but still corresponds to a half step. This second orientation is shown between game pieces 26 and 32 (representing a half step from a blank to note $E_b$); 22 and 30 (representing a half step from notes F to $G_b$); 30 and 24 (representing a half step from notes $G_b$ to G); and 46 and 28 (representing a half step from a blank to note $B_b$). The first orientation in this embodiment is a lateral spatial relationship between adjacent selected game pieces, but still corresponds to a whole step. This first orientation is shown between game pieces 16 and 26 (representing a whole step from note C to a blank); 32 and 22 (representing a whole step from notes $E_b$ to F); 24 and 46 (representing a whole step from note G to a blank); and 28 and 48 (representing a whole step from notes $B_b$ to C). The reversal in orientations corresponding to a longitudinal spatial relationship and a lateral spatial relationship allows the blues scale 42 to be represented in a hop-scotch configuration. If this reversal in spatial relationships was not made, the arranging of the selected game pieces may not result in a hop-scotch configuration. In FIG. 4, the one and one-half step from note C to note $E_b$ is represented by requiring the user to go laterally from game piece 16 first to game piece 26, which corresponds to a whole step, and then longitudinally from game piece 26 to game piece 32, which is a half-step, thus yielding a one and one-half step between notes C and $E_b$, successive notes in the blues music scale 42.

A similar representation of the one and one-half step between successive notes in a music scale is shown in FIG. 5, which is a gypsy minor scale 44. In FIG. 5, like in FIG. 4, the second orientation is a longitudinal spatial relationship between adjacent selected game pieces and corresponds to a half step and the first orientation is a lateral spatial relationship between adjacent selected game pieces and corresponds to a whole step. Therefore, in FIG. 5, a one and one-half step from note C to note D# is represented by requiring the user to go laterally from game piece 16 first to game piece 26, which corresponds to a whole step, and then longitudinally from game piece 26 to game piece 36, which is a half step, thus yielding a one and one-half step between notes C and D#, successive notes in the gypsy minor scale 44. Likewise, in FIG. 5, the movement from note F to note G# is also a one and one-half step and is represented in the same fashion by employing blank game piece 46. Since the steps between successive notes in typical music scales vary in one-half step increments or multiples thereof, similar use of blank game pieces 26, 46 may be employed to represent any step between notes of greater than a whole step.

Preferably, the method of teaching music theory also involves the student actually playing hop-scotch to facilitate the learning of the different steps in various music scales after the game pieces have been arranged in the music scale.

The manual 50 preferably instructs the user to start on the left most game piece that is located at the bottom of the hop-scotch configuration and move along the game pieces following a pre-determined priority of movement options until the game piece corresponding to the next successive note in the music scale is encountered. The manual 50 further instructs the user to, if possible, first move from left to right in a lateral direction if there is a laterally adjacent game piece to the right. The user is instructed that if there is no laterally adjacent game piece to the right, to move longitudinally upward to the next level of game piece(s) and to go to the game piece at that level which is at the left most lateral orientation. The user is then to follow the same two instructions with the priority of movement being dictated by first moving laterally from left to right and second moving longitudinally from bottom to top if a lateral move is not possible. This continues until the user comes to the top most note of the music scale. If a blank space 26, 46 is encountered the user proceeds to immediately follow the priority of movement instructions to move to a game piece wherein a note is represented.

With this priority of movement, the game of hop-scotch may be played. The rules for playing hop-scotch, being well known, will not be recited herein, but it is to be understood that this method is not limited to the teaching of music scales by only following the rules of hop-scotch. Modification of the hop-scotch rules may be employed or new rules created and employed where the understanding of music theory and scales may be enhanced or the learning can be made more entertaining.

It is also to be understood that while the preferred embodiment is that of arranging game pieces in a hop-scotch type configuration, other spatial relationships may be employed without departing from the scope of this invention.

Users may also be instructed to include multiple users to be able to represent triads, augmented and diminished cords, major and minor scales, as well as inversions of all of these. Auditory inputs may also be associated with the game pieces such that as the user moves along the various game pieces the assigned note may be sounded. This method of aural training will also improve the user's ability to match pitches. These auditory responses may come from a variety of sources such as users singing the notes, ringing of bells, playing the piano or any other method of producing notes.

While the preferred embodiment has been described in the context of game pieces that are physically manipulated and arranged into various configurations, it is equally applicable to a computer game wherein the same principles are employed and an interactive computer version is used. It is also important to note that the auditory response could be incorporated into the actual game pieces such that when a user touched, stepped on, or somehow activated the game piece, the assigned note would be produced. In a further embodiment, the game pieces may also be connected to a computerized version of the game such that it is interactive not only with the computer screen but also with the game pieces that the user will actually manipulate by hand.

In view of the above, it will be seen that the several objects of the invention are achieved and other advantageous results attained.

As various changes could be made in the above constructions or methods without departing from the scope of the invention, it is intended that all matter contained in the above description or shown in the accompanying drawings shall be interpreted as illustrative and not in a limiting sense.

What is claimed is:

1. A method of teaching music theory comprising:

providing a plurality of game pieces, the game pieces corresponding to notes of a music scale, the game pieces being arrangeable in a manner in which each of the game pieces is adjacent to at least one of the other of the game pieces;

assigning a first orientation to correspond to a musical whole step, the first orientation constituting a first spatial relationship between adjacent game pieces;

assigning a second orientation to correspond to a musical half step, the second orientation constituting a second spatial relationship between adjacent game pieces, the second spatial relationship differing from the first spatial relationship;

arranging the game pieces in a manner so that a first one of the game pieces is adjacent to at least one of the other of the game pieces in the first orientation and a second one of the game pieces is adjacent to at least one of the other of the game pieces in the second orientation, the step of arranging comprising using the first and second orientations to arrange the game pieces to correspond to notes of a first music scale with the game pieces corresponding to the different notes of the first music scale;

rearranging the game pieces into a second arrangement with the game pieces corresponding to notes of a second music scale, the second music scale differeing from the first music scale, each of the game pieces when in the second arrangement being adjacent to at least one of the other of the game pieces in either the first or second orientations.

2. A method as set forth in claim 1 wherein providing a plurality of game pieces comprises providing at least eight game pieces.

3. A method as set forth in claim 2 wherein the music scale has eight notes and wherein each note is represented by a different game piece.

4. A method as set forth in claim 3 wherein the first orientation comprises a longitudinal spatial relationship between adjacent game pieces and the second orientation comprises a lateral spatial relationship between adjacent game pieces.

5. A method as set forth in claim 4 wherein arranging the game pieces comprises arranging the game pieces on a surface in a hop-scotch configuration.

6. A method of teaching music theory comprising:

providing at least eight game pieces, the game pieces corresponding to notes of a music scale, the game pieces being arrangeable in a manner in which each of the game pieces is adjacent to at least one of the other of the game pieces;

assigning a first orientation to correspond to a musical whole step, the first orientation constituting a first spatial relationship between adjacent game pieces;

assigning a second orientation to correspond to a musical half step, the second orientation constituting a second spatial relationship between adjacent game pieces, the second spatial relationship differing from the first spatial relationship;

arranging the game pieces in a manner so that a first one of the game pieces is adjacent to at least one of the other of the game pieces in the first orientation and a second one of the game pieces is adjacent to at least one of the other game pieces in the second orientation, the step of arranging comprising using the first and second orientations to arrange the game pieces to correspond to notes of a music scale with the game pieces corresponding to the different notes of the music scale, the music scale having eight notes and wherein each note is represented by a different game piece, the step of arranging the game pieces comprising arranging the game pieces on a surface in a hop-scotch configuration; and playing hop-scotch on the game pieces.

7. A kit for facilitating teaching of music theory to a user, the kit comprising:

a plurality of game pieces; and a manual packaged with the game pieces;

said game pieces having indicia corresponding to notes of a music scale, said game pieces being arrangeable in a manner in which each of the game pieces is adjacent to at least one of the other of said game pieces;

the manual including instructions (a) assigning a first orientation to correspond to a musical whole step, the first orientation constituting a first spatial relationship between adjacent game pieces, (b) assigning a second orientation to correspond to a musical half step, the second orientation constituting a second spatial relationship between adjacent game pieces, the second spatial relationship differing from the first spatial relationship, and (c) directing the user to arrange at least some of the game pieces in a manner so that each of the game pieces of said at least some of the game pieces is adjacent at least one of the other game pieces of said at least some of the game pieces in one of the first and second orientations. game pieces is adjacent at least one of the other game pieces of said at least some of the game pieces in one of the first and second orientations.

8. The kit of claim 7 wherein the manual includes instructions directing the user to arrange said at least some of the game pieces in a manner so that each of the game pieces of said at least some of the game pieces is adjacent at least one of the other game pieces of said at least some of the game pieces in one of the first and second orientations and corresponds to the notes of a music scale.

9. The kit of claim 8 wherein the music scale constitutes a first music scale and the manual includes instructions directing the user to arrange at least some of the game pieces in a manner so that each of the game pieces of said at least some of the game pieces is adjacent at least one of the other game pieces of said at least some of the game pieces in one of the first and second orientations and corresponds to the notes of a second music scale.

10. The kit of claim 9 wherein the plurality of game pieces comprise at least eight game pieces.

11. The kit of claim 10 wherein the manual includes instructions directing the user to select a music scale and to arrange at least some of the game pieces in a manner so that each of the game pieces of said at least some of the game pieces is adjacent at least one of the other game pieces of said at least some of the game pieces in one of the first and second orientations and corresponds to the notes of the selected music scale.

12. The kit of claim 11 wherein the manual includes instructions assigning the first spatial relationship as a longitudinal spatial relationship between adjacent game pieces and assigning the second spatial relationship as a lateral spatial relationship between adjacent game pieces.

13. The kit of claim 12 wherein the instructions of the manual directing the user to arrange at least some of the game pieces comprises instructions directing the user to arrange the at least some of the game pieces on a surface in a hop scotch configuration.

14. The kit of claim 13 wherein the manual includes instructions directing the user to play hop scotch on the at least some of the game pieces.

15. The kit of claim 11 wherein the manual includes instructions assigning the first spatial relationship as a lateral spatial relationship between adjacent game pieces and assigning the second spatial relationship as a longitudinal spatial relationship between adjacent game pieces.

16. The kit of claim 15 wherein the instructions of the manual directing the user to arrange at least some of the game pieces comprises instructions directing the user to arrange the at least some of the game pieces on a surface in a hop scotch configuration.

17. The kit of claim 16 wherein the manual includes instructions directing the user to play hop scotch on the at least some of the game pieces.

18. The kit of claim 9 wherein said game pieces are adapted to make the sound corresponding to the note represented by the indicia on said game piece.

* * * * *